United States Patent [19]

Eger et al.

[11] Patent Number: 5,610,343
[45] Date of Patent: Mar. 11, 1997

[54] BALANCE WITH ONE OR SEVERAL WIRE STRAIN GAUGE WEIGHING CELLS

[75] Inventors: Matthias Eger, Wollbrandshausen; Heinz-Gerhard Köhn, Dransfeld; Werner Schulze; Christoph Berg, both of Göttingen, all of Germany

[73] Assignee: Sartorius AG, Göttingen, Germany

[21] Appl. No.: 622,421

[22] Filed: Mar. 27, 1996

[30] Foreign Application Priority Data

Mar. 28, 1995 [DE] Germany .......................... 195 11 353.5
Mar. 28, 1995 [DE] Germany .......................... 195 11 354.3

[51] Int. Cl.$^6$ ..................................................... G01L 1/00
[52] U.S. Cl. .................. 73/862.628; 73/862.621; 73/862.627; 177/210 R
[58] Field of Search .................. 73/862.622, 862.623, 73/862.627, 862.628, 862.626, 763, 764; 177/210 R

[56] References Cited

U.S. PATENT DOCUMENTS

| | | | |
|---|---|---|---|
| 4,261,195 | 4/1981 | Lockery | 177/211 |
| 4,574,899 | 3/1986 | Griffen | 73/862.628 |
| 4,733,571 | 3/1988 | Ormond | 73/862.622 |
| 5,357,189 | 10/1994 | Egami | 324/706 |
| 5,369,226 | 11/1994 | Griffen et al. | 73/862.628 |

Primary Examiner—Richard Chilcot
Assistant Examiner—Ronald Biegel
Attorney, Agent, or Firm—Eric P. Schellin

[57] ABSTRACT

It is suggested for a balance with one or several weighing cells (1–4, 31) with a total of at least eight wire strain gauges ($D_1$–$D_4$, $S_1$–$S_4$), four of which ($D_1$–$D_4$) are expanded under load and four ($S_1$–$S_4$) compressed under load, in which the eight wire strain gauges are connected together circularly in series so as to form a single Wheatstone bridge which is supplied with voltage along a diagonal (12, 13) (vertical diagonal) and the output signal is taken off along the other diagonal (14, 15) (horizontal diagonal) that a signal is additionally tapped off along the upper horizontal chord (16, 17) and along the lower horizontal chord (18, 19). This makes possible a corner-load adjustment for the balance utilizing the additional signals.

10 Claims, 5 Drawing Sheets

BALANCE WITH ONE OR SEVERAL WIRE STRAIN GAUGE WEIGHING CELLS

BACKGROUND OF THE INVENTION

The invention relates to a balance with one or several weighing cells with a total of at least eight wire strain gauges, four of which are expanded under load and four compressed under load. The eight wire strain gauges are connected together circularly in series so as to form a single Wheatstone bridge. The Wheatstone bridge is supplied with voltage along a diagonal (vertical diagonal) and the output signal is taken off along the other diagonal (horizontal diagonal).

Balances of this type are known, e.g. from EP 0,101,247. If the load is placed at different positions of the load platform in balances of this type, that is, if the individual weighing cells are loaded differently, small differences in the balance display result if the different weighing cells do not have the exact same sensitivity. In the known balance these deviations, the so-called corner-load errors, are compensated by adjustable resistors parallel to the wire strain gauges or in series with the wire strain gauges. However, the calculation of these adjustable resistors is complicated. There is furthermore the danger that as a result of different temperature coefficients of the adjustable resistors and of the wire strain gauges the adjusting of the corner load no longer agrees upon changes in temperature. In addition, the adjustable resistors and the wire strain gauges can take on different temperatures on account of different power losses and different heat dissipation, which produces errors even given the same temperature coefficients of the adjustable resistors and of the wire strain gauges. The same applies if the adjustable resistors and the wire strain gauges age differently.

SUMMARY OF THE INVENTION

The invention therefore has the problem of indicating a balance of the initially mentioned type which makes possible a compensation of the corner-load errors without adjustable resistors parallel to the wire strain gauges or in series with the wire strain gauges.

The invention solves this problem in that a signal is additionally tapped off along the upper horizontal chord and along the lower horizontal chord. As a result thereof, two additional signals are available in addition to the composite signal along the diagonals which two additional signals can be used for corner-load correction in both directions.

In an advantageous further development that the output signal along the horizontal diagonal is intermittently short-circuited and the output signal along the two chords measured both during the short circuit of the diagonals as well as during the time without short circuit. The short circuit produces two individual Wheatstone bridges whose output signals furnish additional information so that even the signals of the individual weighing cells and of the individual wire strain gauge pairs can be calculated.

BRIEF DESCRIPTION OF THE DRAWINGS

The invention will be described in the following using the schematic figures.

DETAILED DESCRIPTION OF DRAWINGS

Figure 1:
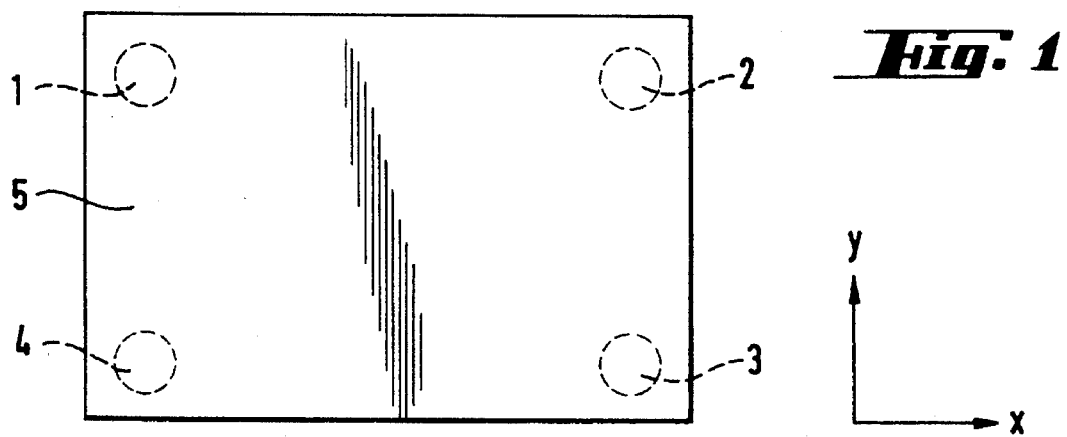
FIG. 1 shows a balance with four weighing cells.
Figure 2:
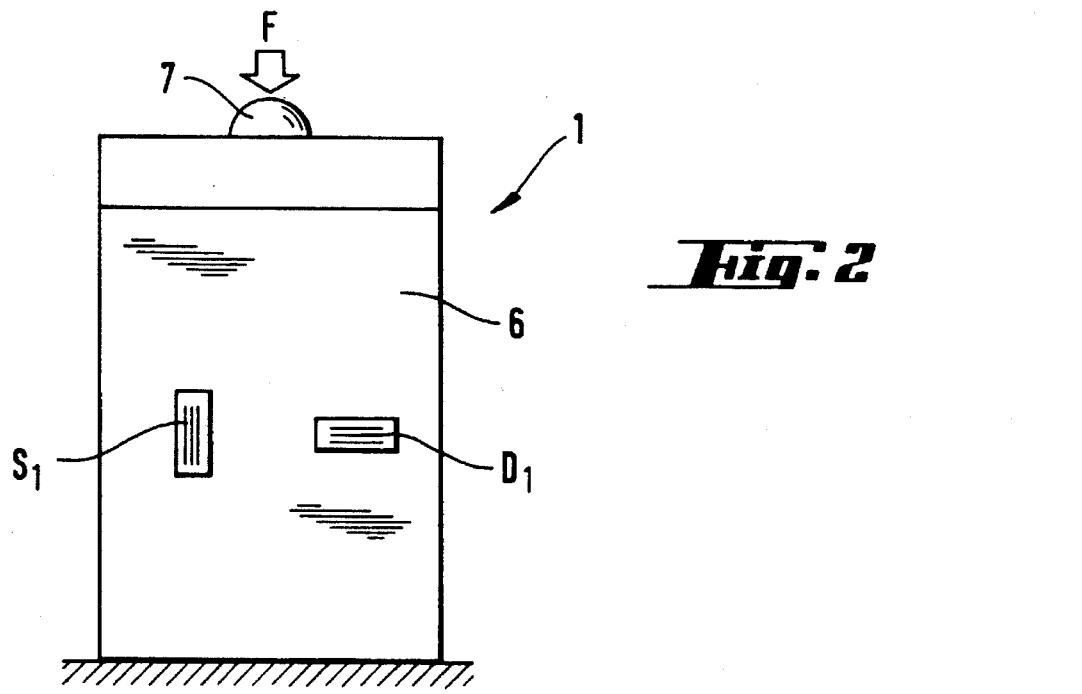
FIG. 2 shows a single weighing cell in a first embodiment.

The balance shown in a top view in FIG. 1 shows the weighing platform 5, supported by four weighing cells 1–4. A single weighing cell 1 is shown in FIG. 2 in a first embodiment in a side view. Load body 6 can be recognized, which is compressed under the influence of the loading force introduced at 7. This compression is converted by wire strain gauge $S_1$ into a proportional resistance change resulting in the lowering of resistance. The transversal dilation of loading body 6 is converted by wire strain gauge $D_1$ into a proportional resistance change resulting in the raising of resistance. Naturally, several wire strain gauges $S_1$ and several wire strain gauges $D_1$ can be distributed along the circumference. All wire strain gauges $S_1$ and all wire strain gauges $D_1$ are then connected in series or in parallel and act like a single wire strain gauge so that in the following reference will always be made to one compressed wire strain gauge $S_1$–$S_4$ and to one expanded wire strain gauge $D_1$–$D_4$.

Figure 3:
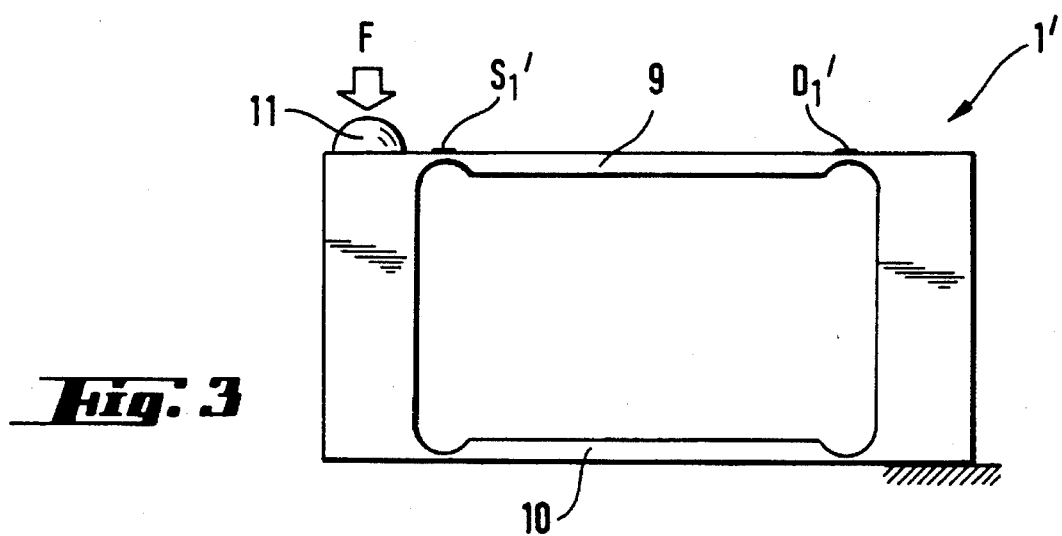
FIG. 3 shows a single weighing cell in a second embodiment.

FIG. 3 shows a second embodiment of the weighing cell. Here, weighing cell 1' has the form of a parallel guide with upper guide rod 9 and lower guide rod 10. The load is introduced at 11 and deforms the parallel guide in such a manner that the one wire strain gauge $D_1$ is expanded and the other wire strain gauge $S_1$ is compressed.

Both embodiments of the weighing cell are generally known, so that the construction and function do not have to be explained in more detail. Other known weighing cells can be used in the same manner, e.g. shearing-force weighing cells comprising two wire strain gauges offset ±° to the horizontal.

Figure 4:
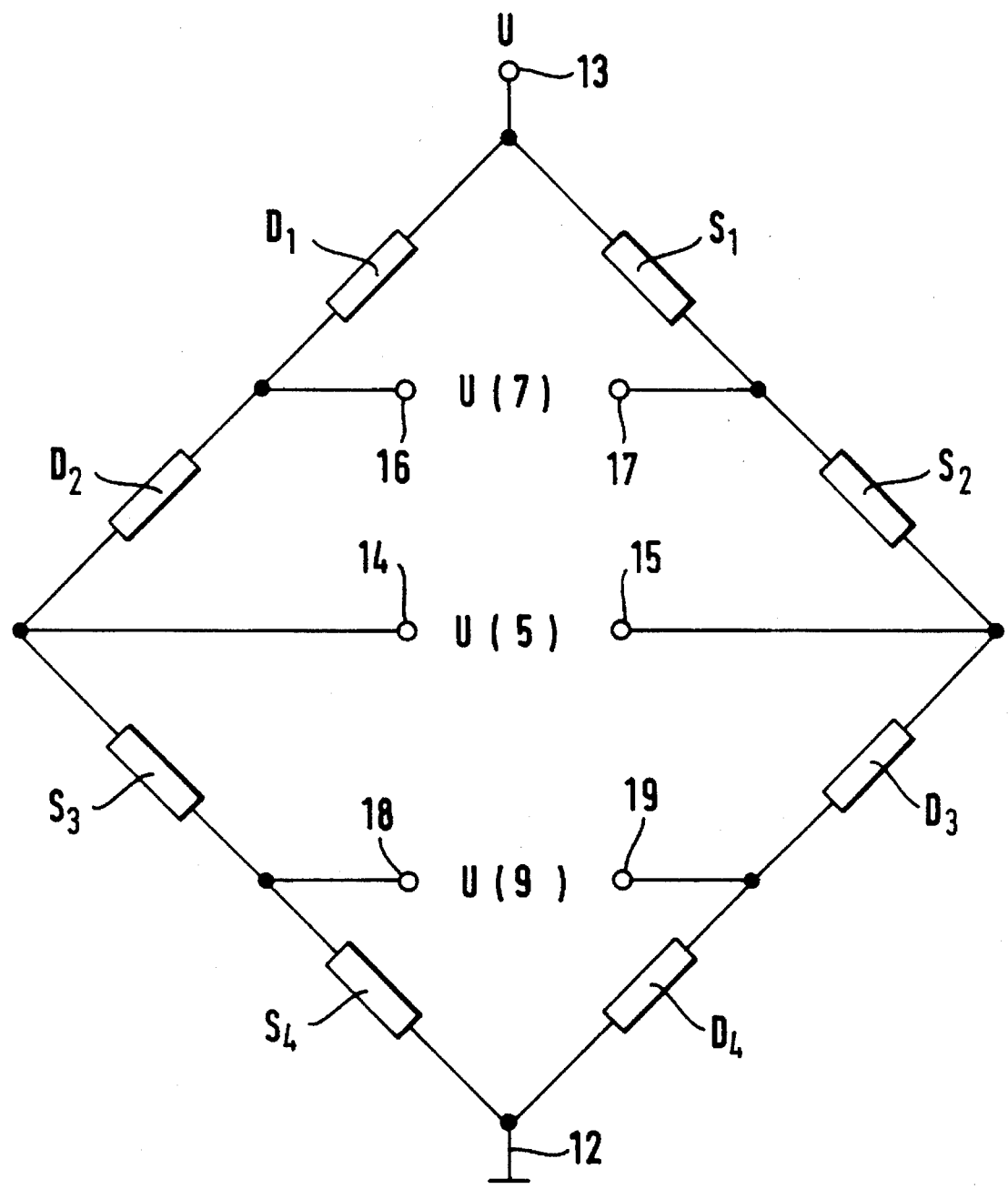
FIG. 4 shows a Wheatstone bridge circuit in a first embodiment.

The eight wire strain gauges of the four weighing cells 1–4 are now connected to a single Wheatstone bridge in accordance with FIG. 4. The subscripts designate the number of the weighing cell, D signifies that the wire strain gauge is expanded under load, S signifies that the wire strain gauge is compressed under load. The voltage supply of the Wheatstone bridge takes place at points 12, 13 along the vertical diagonals. The takeoff of the output voltage takes place in a known manner at points 14, 15 along the horizontal diagonals. This output signal is proportional to the sum of all resistor changes of the wire strain gauges $D_1$–$D_4$ and $S_1$–$S_4$. Given an ideal equality of all four weighing cells this output signal is proportional to the total load on weighing platform 5. However, if the weighing cells are not exactly the same a slight dependency on the site of the load on the weighing platform remains in this output signal. According to the state of the art this corner-load error is adjusted by adjustable resistors in parallel or in series with wire strain gauges $D_1$–$D_4$ and $S_1$–$S_4$. According to the invention, instead of this, in addition to the output signal along horizontal diagonal 14, 15 a signal along the upper horizontal chord (points 16, 17) and a signal along the lower horizontal chord (points 18, 19) are tapped off. The following equation is valid for the voltage U(5) tapped off along diagonals 14, 15:

$$U(5) \sim d_1 + d_2 + d_3 + d_4 - s_1 - s_2 - s_3 - s_4 \qquad (1)$$
$$\sim (d_1 - s_1) + (d_2 - s_2) + (d_3 - s_3) + (d_4 - s_4)$$

Here, $d_n$ is the resistance change of wire strain gauge $D_n$ and $s_n$ the resistance change of wire strain gauge $S_n$ (n=1–4 in each instance). Since wire strain gauges $D_n$ are expanded under load and wire strain gauges $S_n$ are compressed under load, $d_n$ and $s_n$ have different signs. The differences indicated in equation (1) in parentheses are therefore in reality additions of the absolute values—they represent the output signal of the particular weighing cell. Voltage U(5) therefore represents the composite signal of all four weighing cells.

In the same manner the following applies to the voltage U(7) along the upper chord:

$$U(7) \sim d_1 + s_2 + d_3 + d_4 - s_1 - d_2 - s_3 - s_4 \qquad (2)$$
$$\sim (d_1 - s_1) - (d_2 - s_2) + (d_3 - s_3) + (d_4 - s_4)$$

In the same manner the following applies to the voltage U(9) along the lower chord:

$$U(9) \sim d_1 + d_2 + s_3 + d_4 - s_1 - s_2 - d_3 - s_4 \qquad (3)$$
$$\sim (d_1 - s_1) + (d_2 - s_2) - (d_3 - s_3) + (d_4 - s_4)$$

The following equations can now be derived from equations (1)–(3) by mathematical transformation:

$$(d_2 - s_2) - (d_3 - s_3) \sim \tfrac{1}{2} \cdot [U(9) - U(7)] \qquad (4)$$

$$\frac{(d_1 - s_1) + (d_4 - s_4)}{2} - \frac{(d_2 - s_2) + (d_3 - s_3)}{2} \sim 1/2 \cdot [U(7) + U(9) - (U(5)] \qquad (5)$$

The magnitude of the off-center loading in the one direction (y direction in FIG. 1) can be derived from equation (4) and from equation (5) in the other direction (x direction in FIG. 1). The corner-load dependency in signal U(5) can then be corrected by multiplying these expressions by stored coefficients of correction and by subsequent addition to signal U(5).

The corner-load correction described above can be carried out digitally in a microprocessor. For this the individual signals must be digitized (simultaneously or immediately one after the other via a multiplexer). The correction factors are digitally stored and the correction then carried out by an appropriate computer program. Then, only digital values enter into the magnitude of the corner-load correction which change neither with the temperature nor with the time. The accuracy is therefore determined only by the quality of the wire strain gauges—additional errors are not introduced by the corner-load correction. However, an analog-electric solution is also possible: The addition of the individual signals is then carried out by an analog summation amplifier and the summation resistors determine the coefficients of correction. Much lower requirements are placed on the summation resistors than on the adjustable resistors in accordance with the state of the art. Since the resistance change of the wire strain gauges under load is less than 1% a change of resistance of an adjustable resistor in parallel with the wire strain guage has a much greater action than an equally large percent change of a summation resistor.

Figure 5:
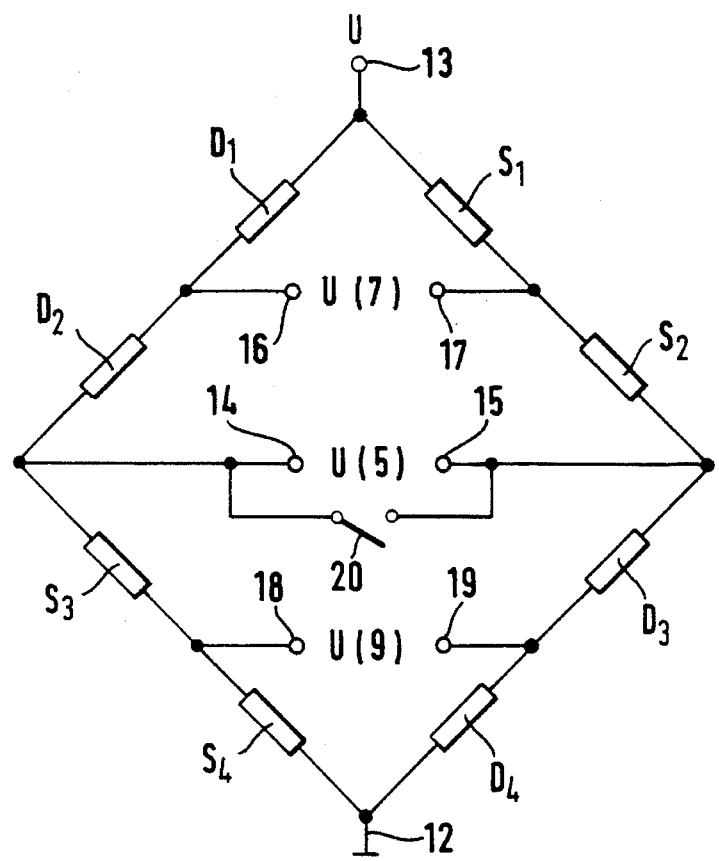
FIG. 5 shows a Wheatstone bridge circuit in a second embodiment.

The corner-load correction described above is based on the fact that one adjustment in the x direction and one adjustment in the y direction in FIG. 1 suffices for a corner-load adjustment. This is met in the case of rigid weighing platform 5. However, if weighing platform 5 is resilient, an individual adjustment of all four weighing cells must take place. In this instance it is advantageous to use a circuit in accordance with FIG. 5. This circuit is identical, except for an additional switch 20, with the circuit FIG. 4. Thus, in the open state of circuit 20 the same signals can be tapped off. However, if switch 20 is closed, bridge diagonal 14, 15 is short-circuited and two separate Wheatstone bridge circuits with four wire strain gauges each are created. The voltage on outputs 16, 17 is named U(k7) in the case of closed switch 20 and the voltage on outputs 18, 19 corresponds to U(k9). The following then applies to these voltages:

$$U(k7) \sim d_1 - d_2 - s_1 + s_2 \qquad (6)$$
$$\sim (d_1 - s_1) - (d_2 - s_2)$$

$$U(k9) \sim s_3 - s_4 - d_3 + d_4 \qquad (7)$$
$$\sim -(d_3 - s_3) + (d_4 - s_4).$$

A combination of equations (1)–(3) and (6) and (7) then yields by simple mathematical transformations:

$$d_1 - s_1 \sim \tfrac{1}{4} U(5) - \tfrac{1}{4} U(7) + \tfrac{1}{4} U(9) + \tfrac{3}{4} U(k7) - \tfrac{1}{4} U(k9) \qquad (8)$$

$$d_2 - s_2 \sim \tfrac{1}{4} U(5) - \tfrac{1}{4} U(7) - \tfrac{1}{4} U(9) - \tfrac{1}{4} U(k7) - \tfrac{1}{4} U(k9) \qquad (9)$$

$$d_3 - s_2 \sim \tfrac{1}{4} U(5) + \tfrac{1}{4} U(7) - \tfrac{1}{4} U(9) - \tfrac{1}{4} U(k7) - \tfrac{1}{4} U(k9) \qquad (10)$$

$$d_4 - s_4 \sim \tfrac{1}{4} U(5) + \tfrac{1}{4} U(7) + \tfrac{1}{4} U(9) - \tfrac{1}{4} U(k7) + \tfrac{3}{4} U(k9) \qquad (11)$$

Therefore, the signal of each individual weighing cell can be calculated from the measured voltages. If equations (8)–(11) are added in order to obtain, given ideal equality of all weighing cells, the load-proportional summation signal, it can be immediately recognized that the voltages of chords U(7), U(9), U(k7) and U(k9) cancel each other out and only diagonal voltage U(5) remains.

The voltages of the chords are only needed if the individual weighing cells are not precisely equal. Then, the signal of each weighing cell must be multiplied by a correction factor of $(1+a_n)$ and only then can the addition take place. The correction factors are close to 1 and the values of $a_n$ are therefore small. In this real instance the following is obtained for the sum Σ of the four weighing cells:

$$\begin{aligned}
\Sigma \sim \ & U(5) + 1/4(a_1 + a_2 + a_3 + a_4) \cdot \\
& U(5) + 1/4(-a_1 - a_2 + a_3 + a_4) \cdot \\
& U(7) + 1/4(a_1 - a_2 - a_3 + a_4) \cdot \\
& U(9) + 1/4(3a_1 - a_2 - a_3 - a_4) \cdot \\
& U(k7) + 1/4(-a_1 - a_2 - a_3 + 3a_4) \cdot U(k9)
\end{aligned}$$

The voltages along the chords therefore enter in this real instance as small correction addends into the final result. That is, in the measuring of the voltages along the chords no accuracy requirements must be made which are as high as in the measuring of diagonal voltage U(5). That is, e.g. that the time during which switch 20 is closed is purposefully selected to be shorter than the time during which switch 20 is open and voltage U(5) is measured.

Figure 6:
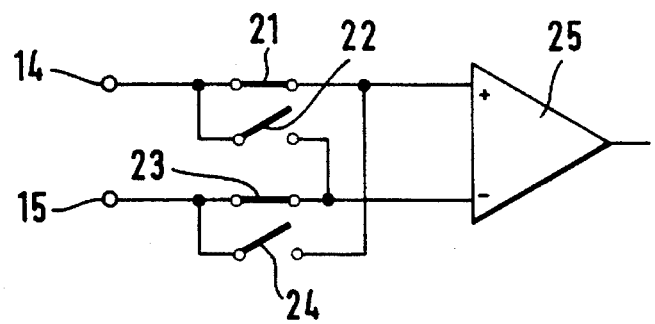
FIG. 6 shows a chopper amplifier.

If a chopper amplifier like the one shown in FIG. 6 is used for the amplification of voltage U(5), change-over switches 21–24 for the chopper amplifier can be used with advantage for the intermittent short circuiting: Normally, either the two switches 21 and 23 or the two switches 22 and 24 are closed while the other two switches are open; as a result thereof the signal voltage is alternatingly commutated. A repeated commutation then takes place after amplifier 25 and any other amplifiers so that the original signal is again available in amplified form. This suppresses direct-voltage drifts and low-frequency noise of amplifier 25 in a known manner. This chopper amplifier is modified in such a manner for the balance of the invention that switches 21–24 are all closed for a brief period during commutation. This achieves the short-circuiting of bridge diagonals 14, 15 only by modification of the switch drive without additional hardware expense.

If the Wheatstone bridge circuit is supplied with a rectangular alternating voltage short-circuit switch 20 is advantageously synchronized with this alternating voltage. For example, the short circuit can take place immediately before or after the polarity change. This minimizes the number of switching transients on the amplifiers which amplify voltages $U(5)$, $U(7)$ and $U(k7)$ and $U(9)$ and $U(k9)$. It is of course also possible to perform the short circuit not at every polarity change but rather e.g. only at each eighth. It is also possible to perform the short circuit e.g. at each eighth polarity change and to maintain the short circuit over a full period of the alternating supply voltage.

The circuit and its interpretation handling of information explained above for four weighing cells with two wire strain gauges each can of course be readily applied to four weighing cells with four wire strain gauges each. Each two wire strain gauges which are expanded under load are then combined and inserted instead of one wire strain gauge into the Wheatstone bridge circuit.

Figure 7:
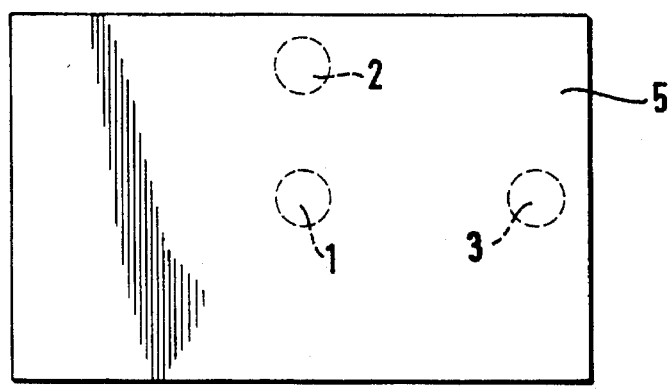
FIG. 7 shows a balance with three weighing cells.

The circuit can also be adapted to a balance with three weighing cells: The three weighing cells are then set e.g. according to FIG. 7 under the load platform. Wire strain gauges $D_4$ and $S_4$ are replaced either by fixed resistors or by wire strain gauges at non-loaded spots or weighing cell 1 receives four wire strain gauges which are inserted at locations $D_1$, $S_1$, $D_4$ and $S_4$ into the Wheatstone bridge circuit according to FIG. 4 whereas weighing cells 2, 3 are unchanged with two wire strain gauges. The composite signal is again obtained along diagonals 14, 16 in FIG. 4 as $U(5)$. The following can then be calculated from the two signals $U(7)$ and $U(9)$:

$$d_2 - s_2 \sim \frac{1}{2}[U(5) - U(7)] \tag{12}$$

$$d_3 - s_3 \sim \frac{1}{2}[U(5) - U(9)] \tag{13}$$

These two corner-load signals can then be used in the manner already described to correct the composite signal.

Figure 8:
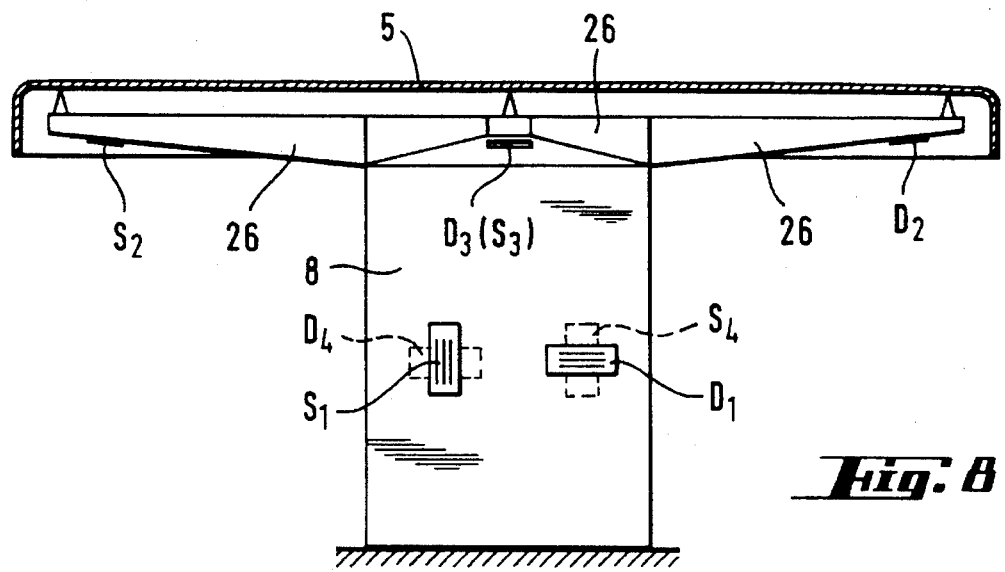
FIG. 8 shows a balance with a weighing cell and additional wire strain gauges for the corner-load moments.

The circuit according to FIG. 4 can also be used for balances with one weighing cell and additional wire strain gauges for measuring the corner-load moments. This configuration is shown in FIG. 8. Weighing cell 8 carries the full load and is provided with two wire strain gauges $S_1$ and $S_4$ which are compressed under load and with two wire strain gauges $D_1$ and $D_4$ which are expanded under load. Wire strain gauges $S_4$ and $D_4$, which are not shown in FIG. 8, are located on the back side of weighing cell 8 symmetrically to wire strain gauges $S_1$ and $D_1$ shown. Weighing platform 5 is connected by a cross-shaped arm 26 to weighing cell 8. Two wire strain gauges $D_2$ and $S_2$ are attached to arm 26 whose differential signal $(d_2-s_2)$ is proportional to the corner-load moment in a right-to-left direction in FIG. 8. In a corresponding manner, two wire strain gauges $D_3$ and $S_3$ are located on the part of arm 26 in front of and behind the drawing plane of FIG. 8 and measure the corner-load moment in a front-to-back direction. Wire strain gauges $D_1$–$D_4$ and $S_1$–$S_4$ are then wired according to FIG. 4. Equations (1)–(3) derived earlier then apply, from which the following is obtained by mathematical transformations:

$$(d_1-s_1)+(d_4-s_4) \sim \frac{1}{2}[U(7)+U(9)] \tag{14}$$

$$d_2-s_2 \sim \frac{1}{2}[U(5)-U(7)] \tag{15}$$

$$d_3-s_3 \sim \frac{1}{2}[U(5)-U(9)] \tag{16}$$

Equation (14) represents the uncorrected load signal and equations (15), (16) then permit the correction of corner-load errors in the manner already described.

Figure 9:
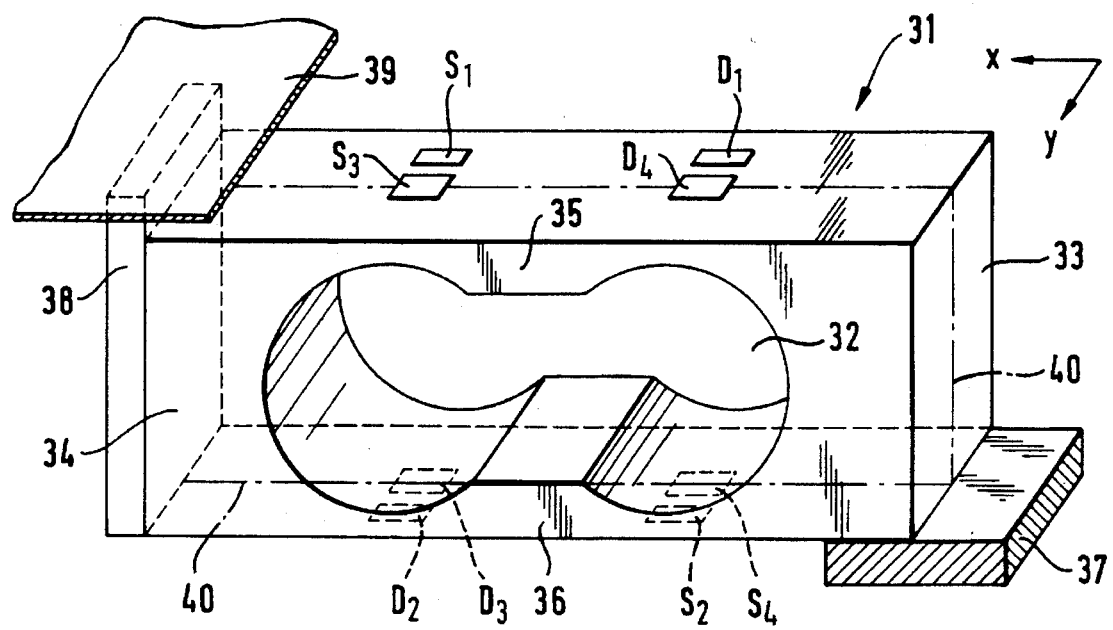
FIG. 9 shows a weighing cell with upper and lower guide rods and eight wire strain gauges in a first embodiment.

FIG. 9 shows another design of a balance with a single weighing cell in a perspective view. Weighing cell 31 consists of a one-piece metal block subdivided by inner opening 32 into stationary area 33, load receiver 34, upper guide rod 35 and lower guide rod 36. Stationary area 33 is connected to a housing 37 which is only indicated; load receiver 34 carries balance scale 39, which is also only indicated, over intermediary piece 38. Four wire strain gauges $S_1$ $S_3$, $D_1$ and $D_4$ are attached to the top of upper guide rod 35. The two wire strain gauges $S_3$ and $D_4$ are arranged in the plane of symmetry of the weighing cell indicated in dotted lines and designated with 40 whereas the two wire strain gauges $S_1$ and $D_1$ are arranged laterally outside of plane of symmetry 40. In a corresponding manner four wire strain gauges $S_2$, $D_2$, $D_3$ and $S_4$ are attached to the bottom of lower guide rod 36; the two wire strain gauges $D_3$ and $S_4$ are arranged in plane of symmetry 40 whereas the two wire strain gauges $S_2$ and $D_2$ are arranged laterally outside of plane of symmetry 40. It is to be noted that wire strain gauges $S_1$, $D_1$ on the one hand and wire strain gauges $S_2$, $D_2$ on the other hand are arranged on different sides of plane of symmetry 40.

In the case of a central loading of the balance scale the four wire strain gauges $D_1$–$D_4$ are expanded and the four wire strain gauges $S_1$–$S_4$ compressed. In the case of off-center loading in the direction x shown in FIG. 9 an additional expansion is superposed in the case of wire strain gauges $S_1$ $S_3$, $D_1$ and $D_4$ and an additional compression in the case of wire strain gauges $D_2$, $D_3$, $S_2$ and $S_4$. In the case of an off-center loading in the y direction an additional expansion is superposed in the case of wire strain gauges $D_1$ and $S_2$ and an additional compression in the case of wire strain gauges $S_1$ and $D_2$ whereas wire strain gauges $S_3$, $D_4$, $D_3$ and $S_4$ remain uninfluenced.

The eight wire strain gauges are now connected together to a Wheatstone bridge circuit according to FIG. 4. Output signal $U(5)$ according to equation (1) then represents the load-dependent output signal since all corner-load dependent influences cancel each other out, given an ideal symmetry, as can be readily reconstructed. Voltage $U(7)$ along the upper chord according to equation (2) is equal to the sum of a load-proportional component (half as large as in $U(5)$) and of a component proportional to the corner-load moment in the y direction. In a corresponding manner voltage $U(9)$ along the lower chord according to equation (3) is equal to the sum of a load-proportional component (again, half as large as in $U(5)$) and of a component proportional to the corner-load moment in the x direction.

The corner-load moment in the y direction is therefore proportional to $U(7)-\frac{1}{2} \cdot U(5)$ and the corner-load moment in the x direction is proportional to $U(9)-\frac{1}{2} \cdot U(5)$. With these corner-load signals and the stored correction coefficients the microprocessor can then correct load signal $U(5)$ from the corner-load errors based on the non-ideal symmetry of weighing cell 31.

Figure 10:
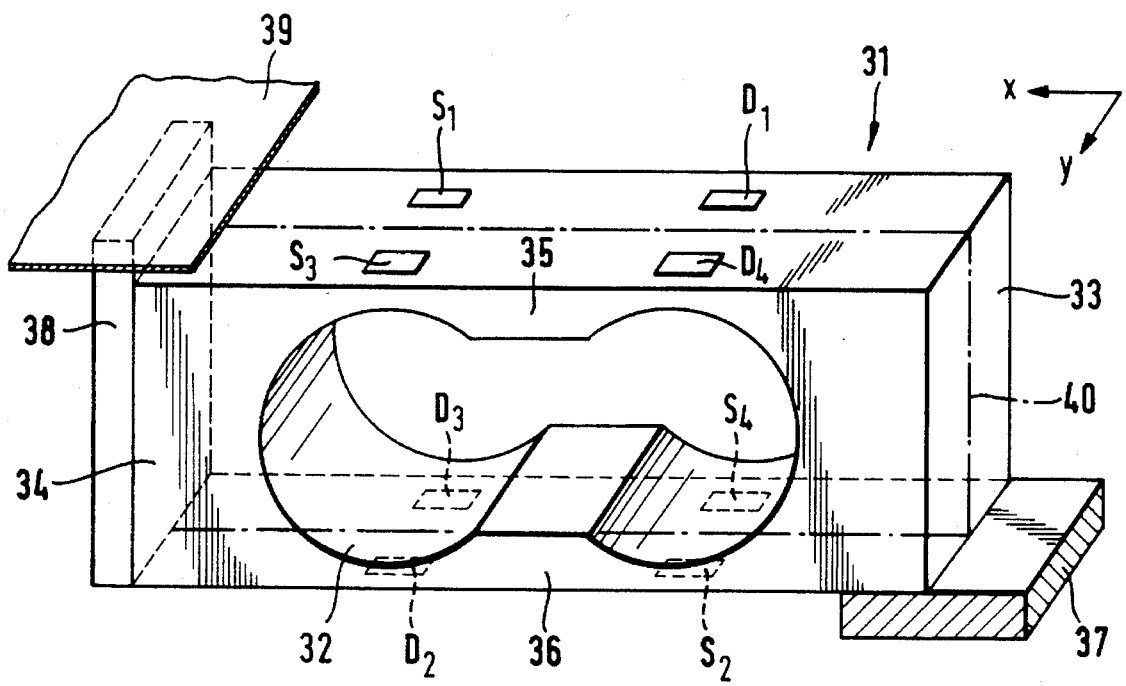
FIG. 10 shows a weighing cell with upper and lower guide rods and eight wire strain gauges in a second embodiment.

A second embodiment of the balance with a single weighing cell with upper and lower guide rod is shown in FIG. 10. The parts which are the same as in FIG. 9 are designated with the same reference numbers. In the embodiment of FIG. 10 wire strain gauges $S_3$, $D_3$, $S_4$ and $D_4$ are not arranged in plane of symmetry 40 of weighing cell 31 but rather are likewise offset laterally out of plane of symmetry 40 symmetrically to the other wire strain gauges. The manner of operation is the same; however, the corner-load signal for the y direction is greater by a factor of 2.

Figure 11:
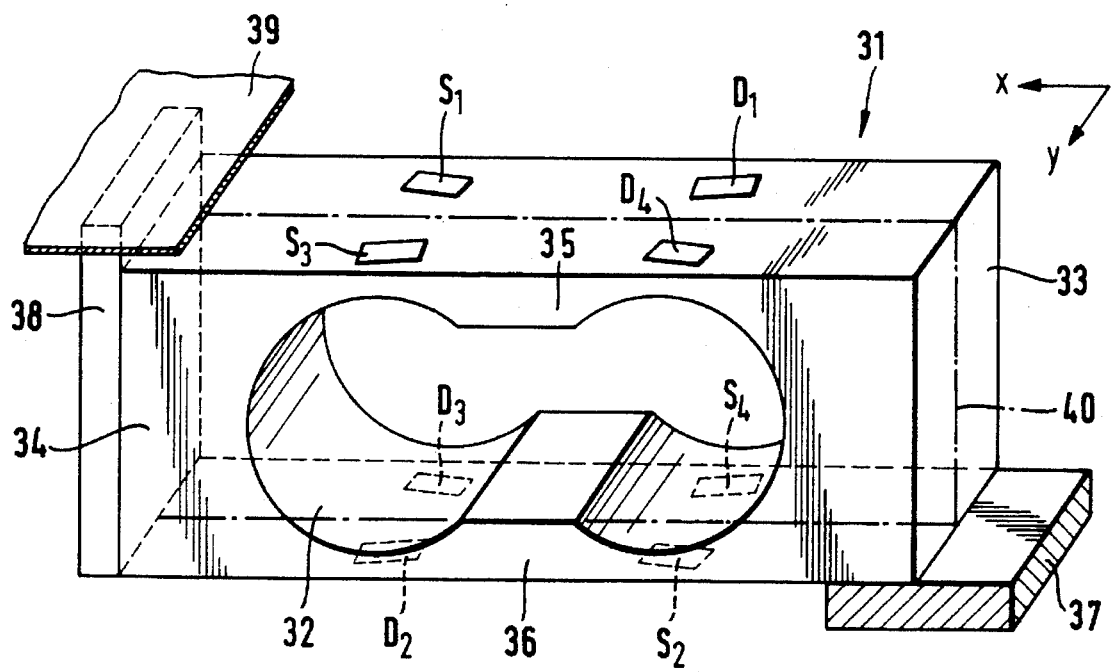
FIG. 11 shows a weighing cell with upper and lower guide rods and eight wire strain gauges in a third embodiment.

The corner-load signal in the y direction can be further increased if the wire strain gauges are not arranged parallel to plane of symmetry 40 as in FIG. 10 but rather somewhat obliquely to it as is shown in FIG. 11. If the angle to plane of symmetry is approximately 10°–20° the signal in the x direction drops only slightly whereas the signal in the y direction clearly rises.

We claim:

1. A balance with one or several weighing cells (1–4, 31) with a total of at least eight wire strain gauges ($D_1$–$D_4$, $S_1$–$S_4$), four of which ($D_1$–$D_4$) are expanded under load and four ($S_1$–$S_4$) compressed under load, in which the eight wire strain gauges are connected together circularly in series so as to form a single Wheatstone bridge which is supplied with voltage along a diagonal (12, 13) (vertical diagonal) and the output signal is taken off along the other diagonal (14, 15) (horizontal diagonal), characterized in that a signal is additionally tapped off along the upper horizontal chord (16, 17) and along the lower horizontal chord (18, 19).

2. The balance according to claim 1, wherein the two additional signals are used to correct deviations produced by unequal sensitivity of the individual weighing cells (1–4) and/or by non-uniform loading of the individual weighing cells (1–4).

3. The balance according to claim 1, wherein the output signal along the horizontal diagonal (14, 15) is intermittently short-circuited and the output signal along the two chords (16, 17 and 18, 19) measured both during the short circuit of the diagonals as well as during the time without short circuit.

4. The balance according to claim 3, wherein the time of the short circuit is less than the time of the non-short circuit.

5. The balance according to claim 3, wherein the signals of the individual weighing cells are calculated from the output signal along the diagonals (14, 15) and from the four output signals along the two chords (16, 17 and 18, 19).

6. The balance according to claim 3, wherein the output signal is amplified along the horizontal diagonals (14, 15) by a chopper amplifier (21–25), characterized in that the short circuit is achieved by appropriately driving the chopper switches (21–24).

7. The balance according to claim 3 wherein there is included an alternating voltage feed of the Wheatstone bridge, characterized in that the frequency of the alternating voltage feed and the frequency with which the output signal (14, 15) is intermittently short-circuited are synchronized with one another.

8. The balance according to claim 1, wherein the weighing cell (31) consists of an upper (35) and a lower guide rod (36) for the parallel guidance of a load receiver (34), that the at least eight wire strain gauges are arranged on the upper (35) and/or the lower guide rod (36) and that at least two wire strain gauges ($S_1$, $D_1$) are shifted laterally out of the plane of symmetry (40) of the weighing cell (31) in one direction and at least two other wire strain gauges ($S_2$, $D_2$) are shifted laterally out of the plane of symmetry (4) of the weighing cell (31) in the other direction.

9. The balance according to claim 8, wherein the wire strain gauges ($S_1$, $D_1$, $S_2$, $D_2$) shifted out of the plane of symmetry (40) of the weighing cell (31) are arranged obliquely to the plane of symmetry (40).

10. The balance according to claim 8, wherein adjacent wire strain gauges are combined to a multiple wire strain gauge.

\* \* \* \* \*